(12) United States Patent
Reineke et al.

(10) Patent No.: US 10,929,011 B1
(45) Date of Patent: Feb. 23, 2021

(54) SYSTEM AND METHOD FOR DYNAMIC GESTURE CONTROL FOR WORKLOAD MANAGEMENT IN A DEPLOYMENT

(71) Applicant: EMC IP Holding Company LLC, Hopkinton, MA (US)

(72) Inventors: Nicole Reineke, Northborough, MA (US); James Robert King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/713,031

(22) Filed: Dec. 13, 2019

(51) Int. Cl.
*G06F 3/0482* (2013.01)
*G06F 3/0488* (2013.01)
*G06F 9/38* (2018.01)
*G06F 9/48* (2006.01)

(52) U.S. Cl.
CPC ........ *G06F 3/04883* (2013.01); *G06F 3/0482* (2013.01); *G06F 9/3836* (2013.01); *G06F 9/4806* (2013.01)

(58) Field of Classification Search
CPC .. G06F 3/04883; G06F 3/0482; G06F 9/3836; G06F 9/4806
See application file for complete search history.

(56) References Cited

U.S. PATENT DOCUMENTS

| | | | |
|---|---|---|---|
| 10,101,819 B2* | 10/2018 | Trattler | G06F 1/3231 |
| 2014/0372907 A1* | 12/2014 | Lee | G06F 3/04883 |
| | | | 715/753 |
| 2016/0103494 A1* | 4/2016 | Zehler | G06F 3/1204 |
| | | | 358/1.15 |
| 2017/0024378 A1* | 1/2017 | Sharma | G06F 3/167 |
| 2017/0374519 A1* | 12/2017 | Hewitt | H04W 4/023 |
| 2018/0129276 A1* | 5/2018 | Nguyen | G09B 9/00 |
| 2018/0270120 A1* | 9/2018 | Tung | H04L 41/145 |

* cited by examiner

*Primary Examiner* — Anil K Bhargava
(74) *Attorney, Agent, or Firm* — Chamberlain Hrdlicka

(57) ABSTRACT

The method includes obtaining a gesture sequence, wherein the gesture sequence comprises a gesture component, identifying a workflow associated with the gesture component using a gesture mapping, wherein the gesture mapping specifies a mapping between the gesture component and the workflow, identifying a target asset of the gesture component, wherein the target asset is part of the deployment, and applying the workflow to the target asset.

15 Claims, 13 Drawing Sheets

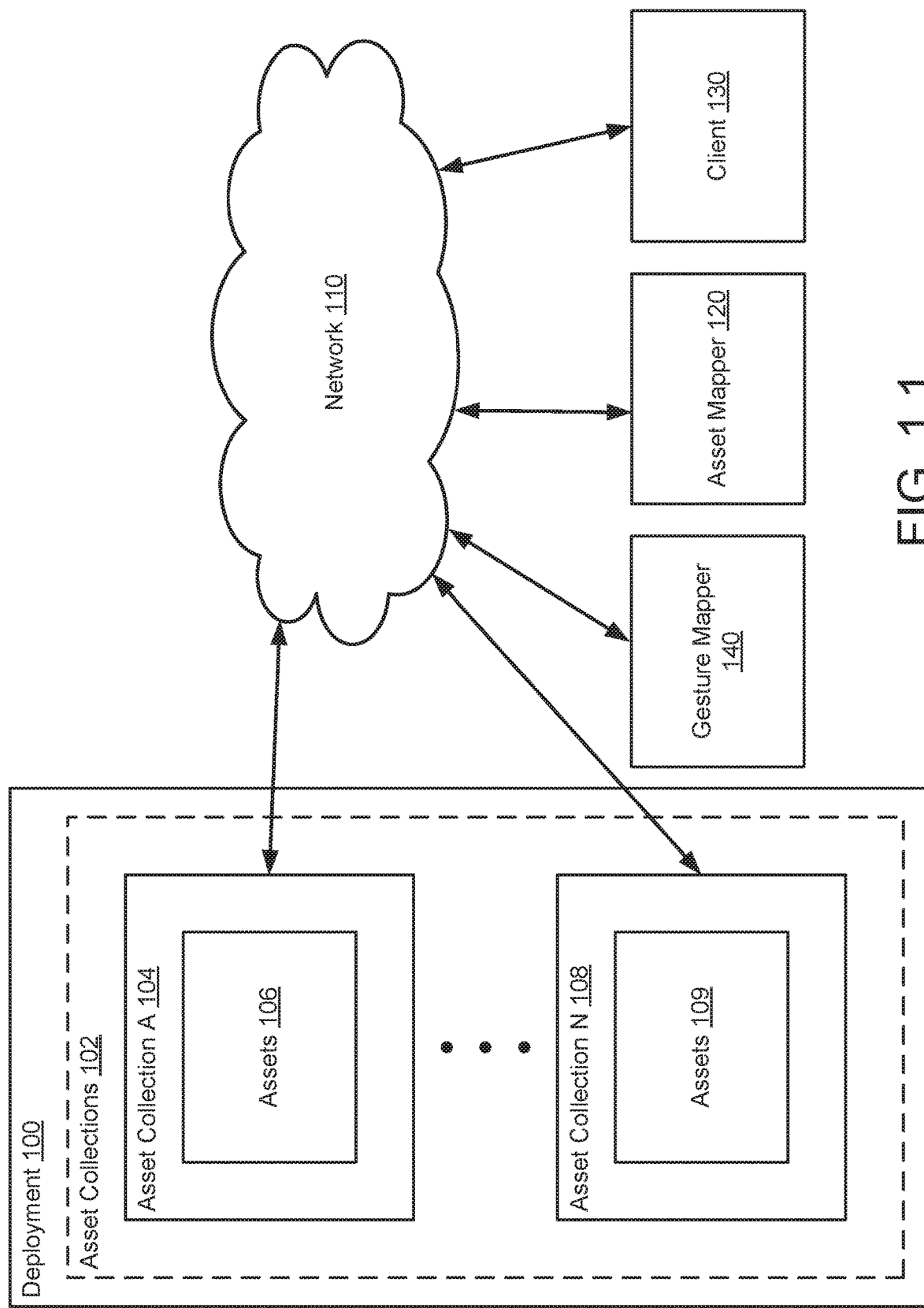
FIG. 1.1

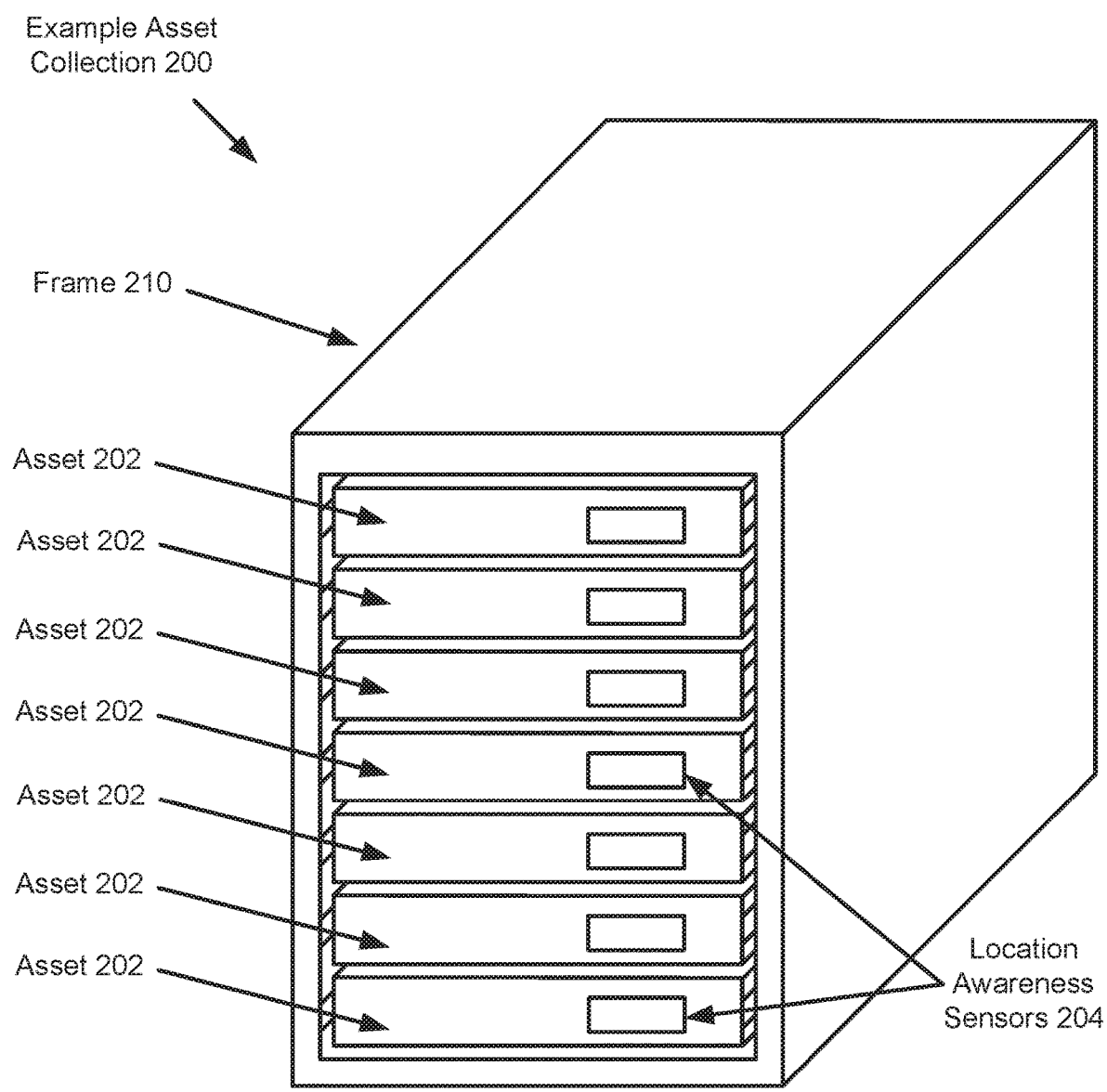
FIG. 2.1

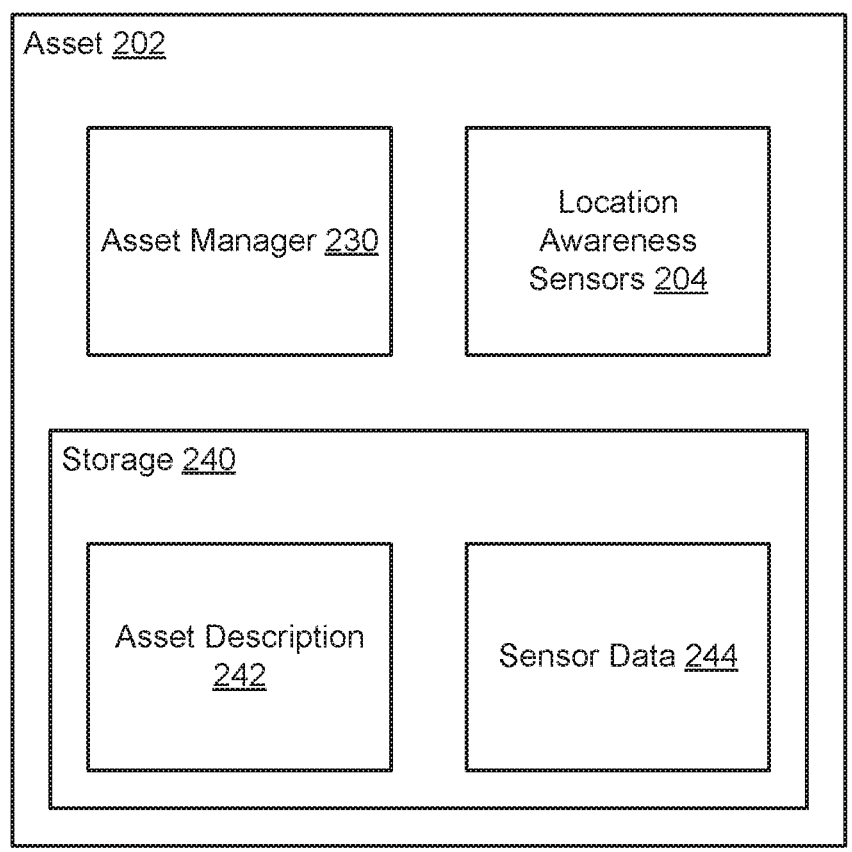
FIG. 2.2

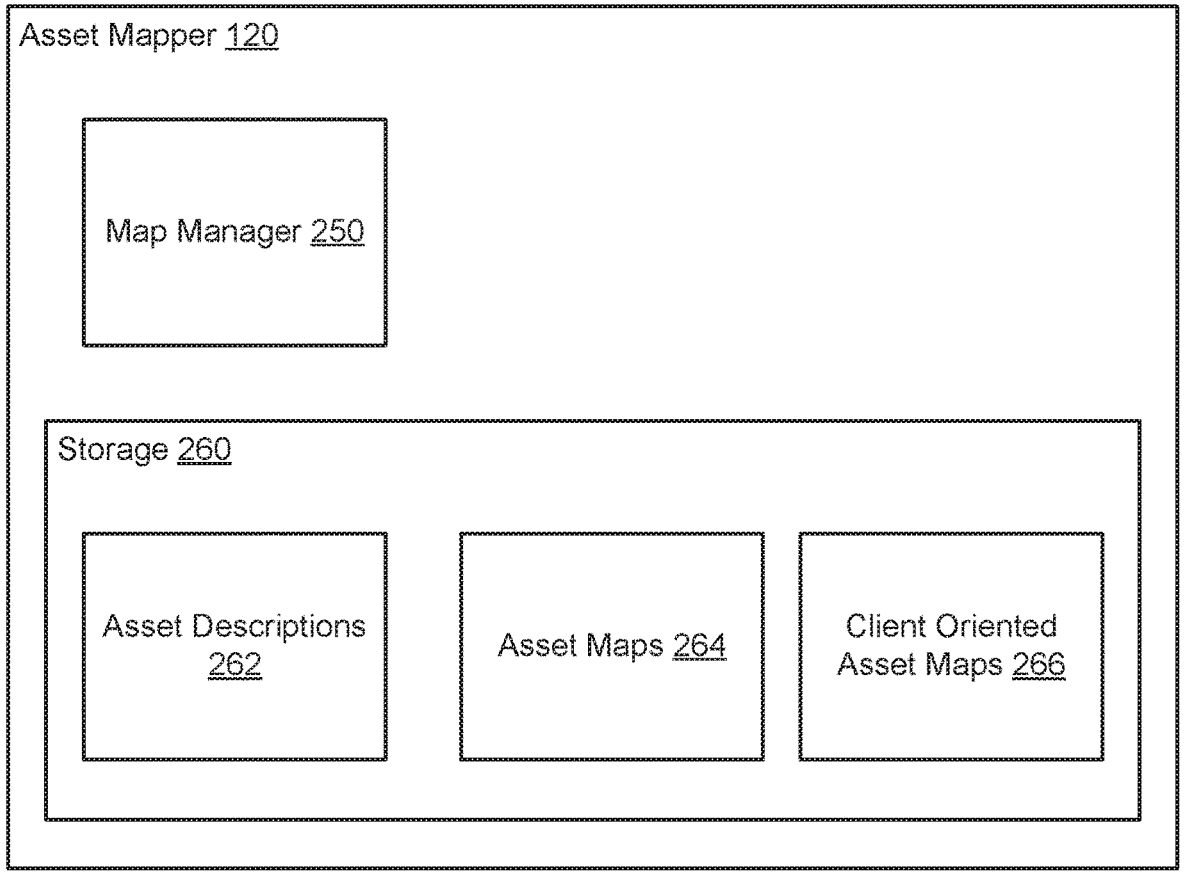
FIG. 2.3

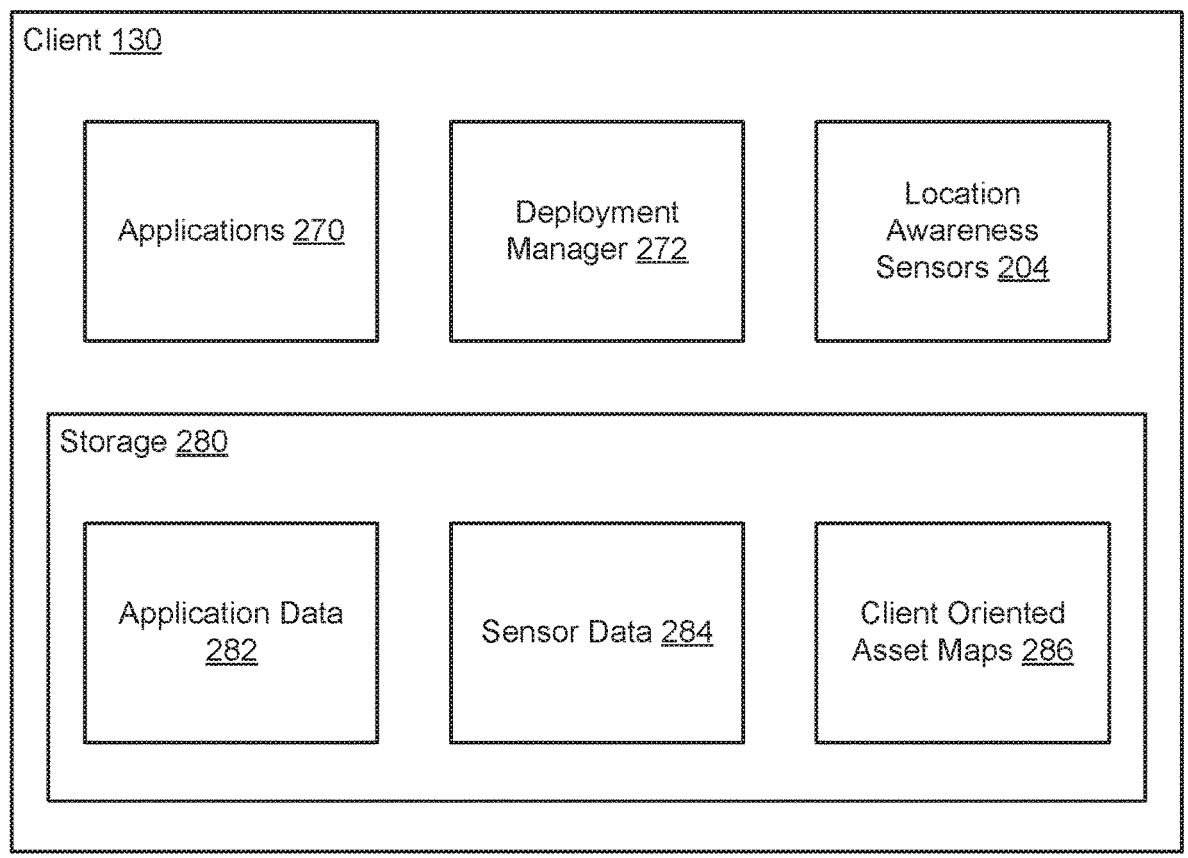
FIG. 2.4

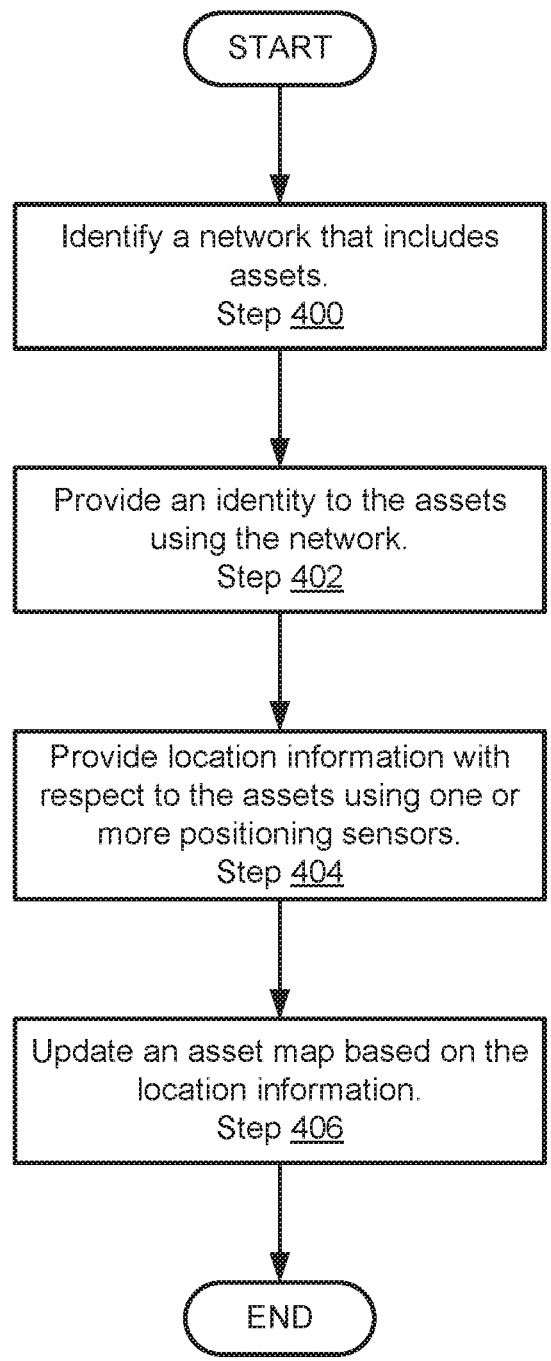
FIG. 4.1

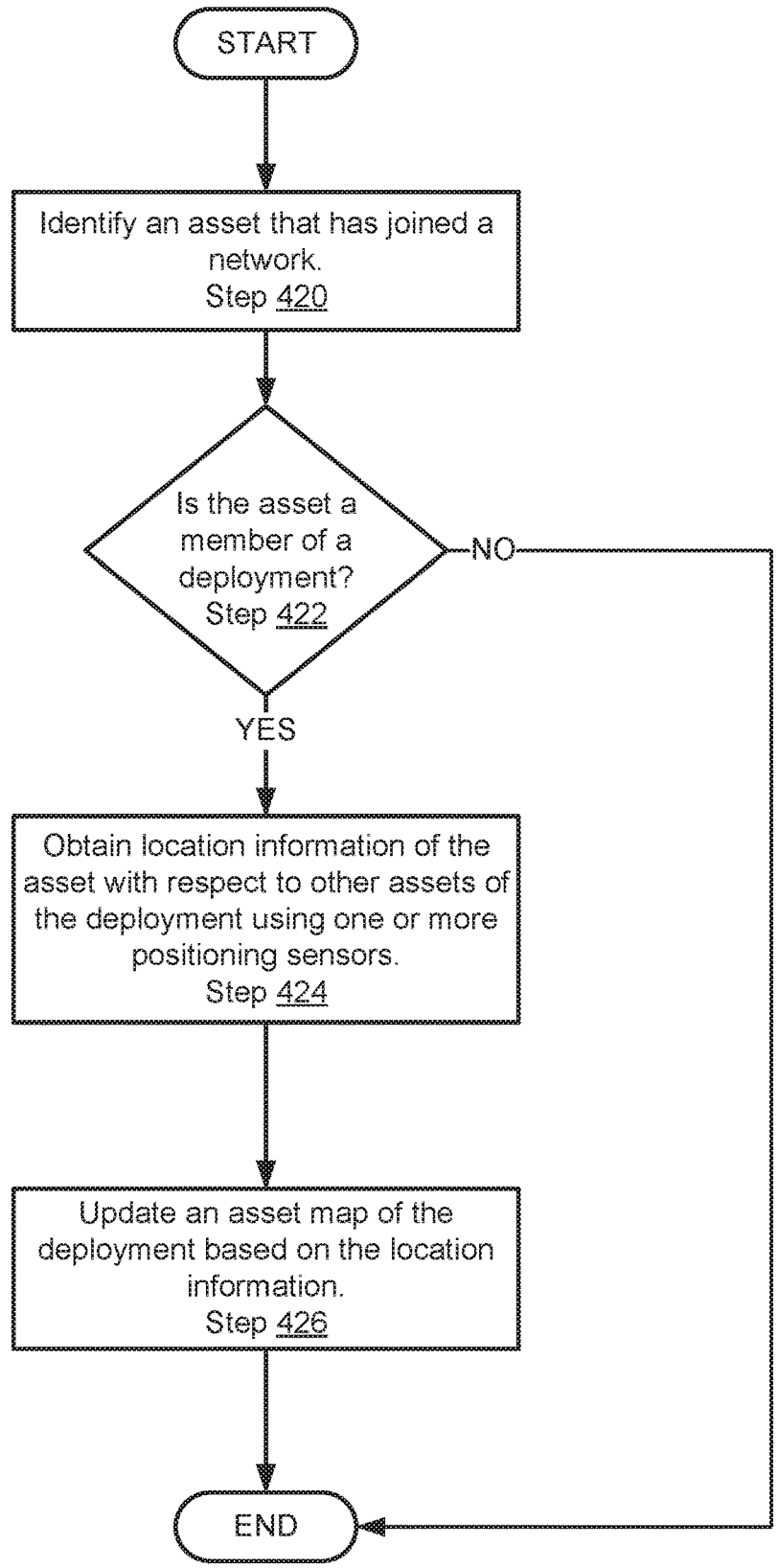
FIG. 4.2

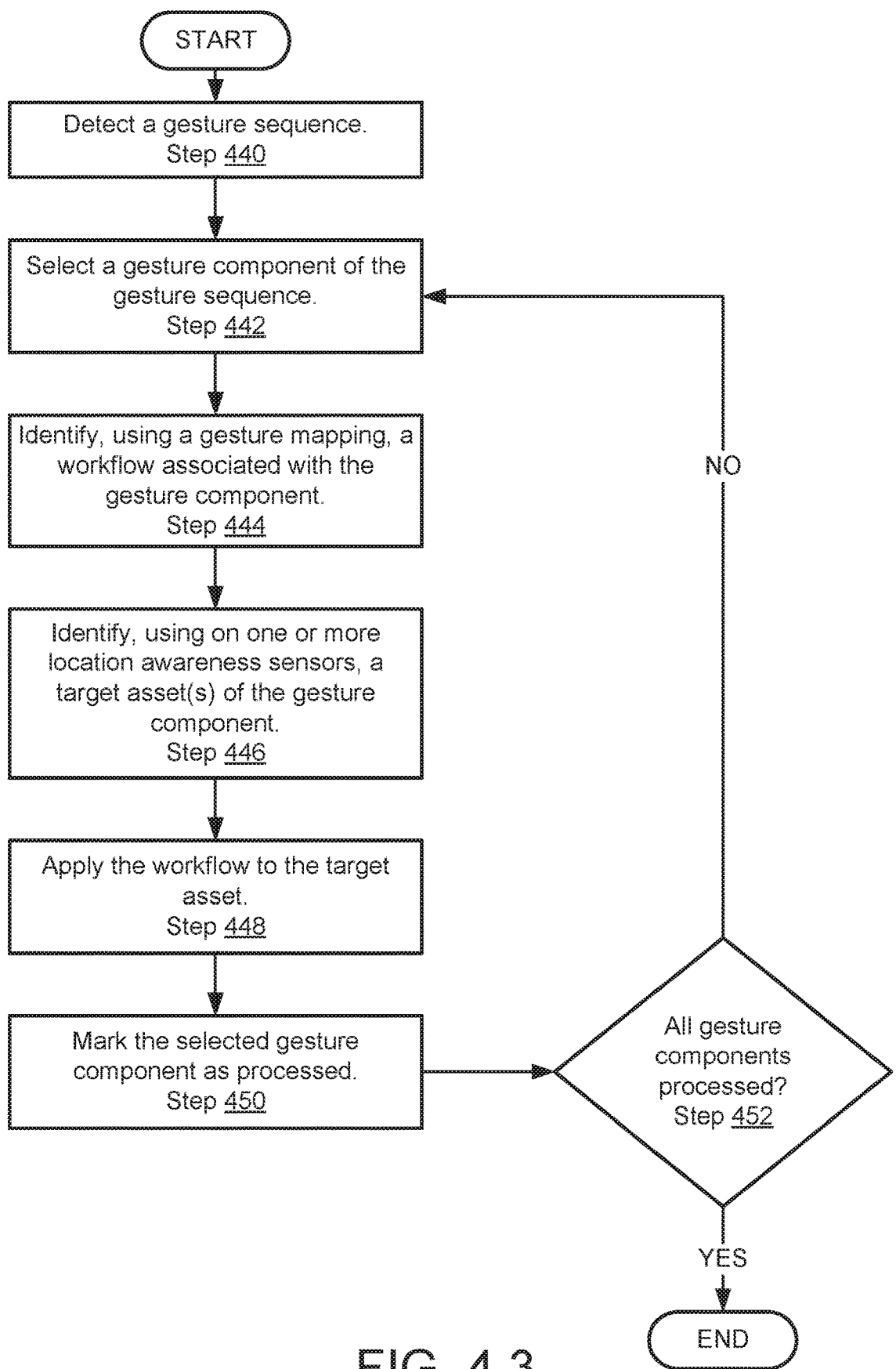
FIG. 4.3

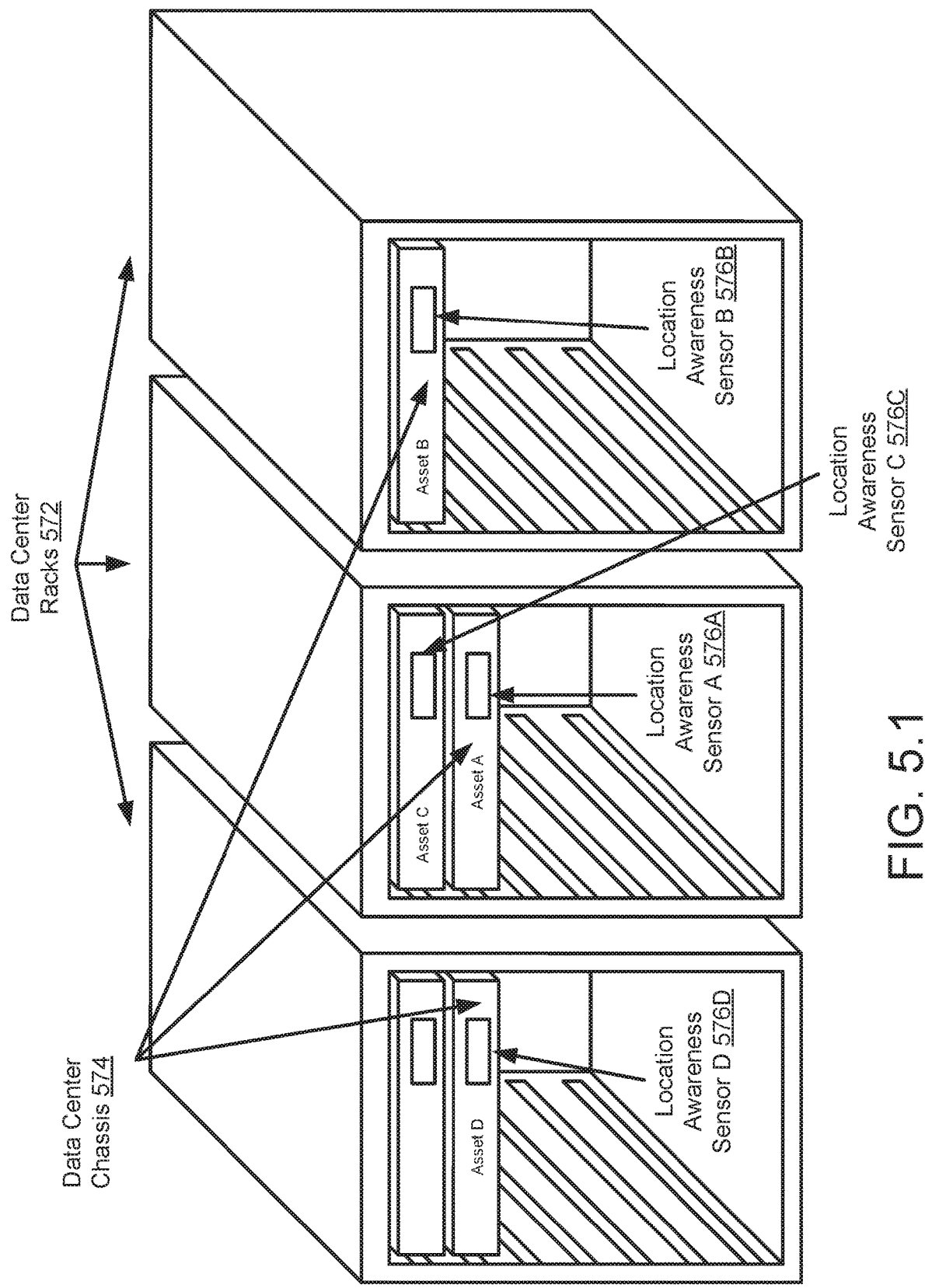
FIG. 5.1

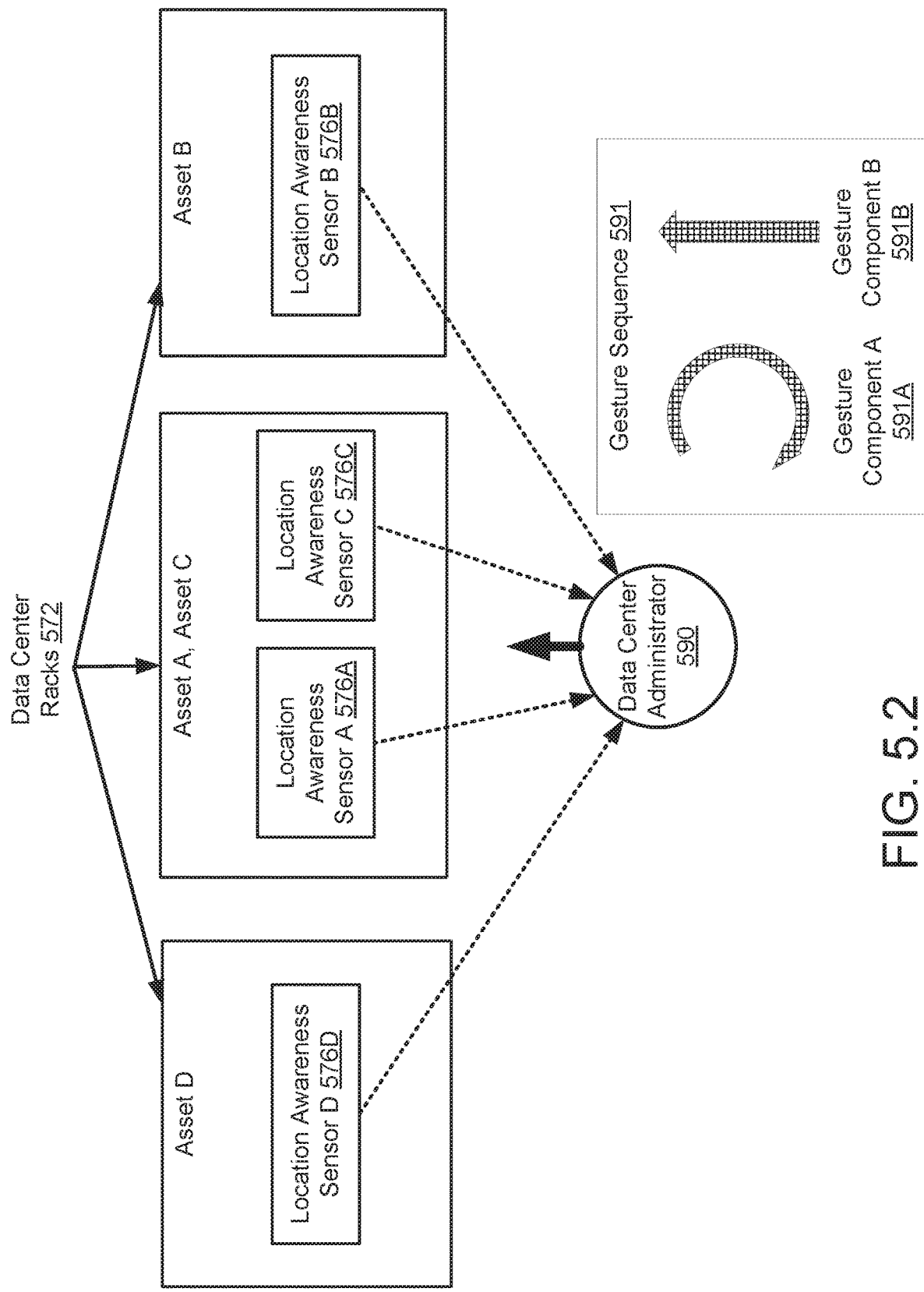
FIG. 5.2

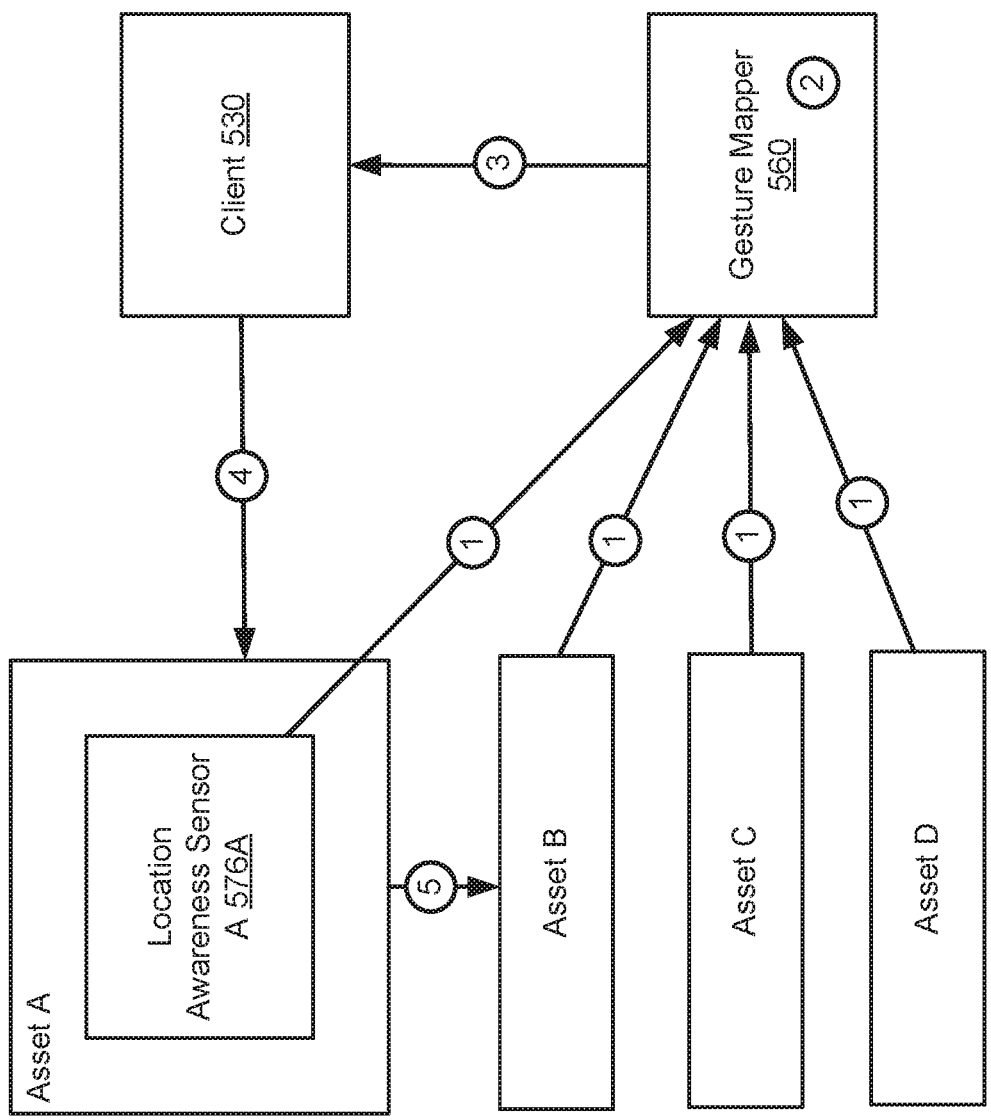
FIG. 5.3

SYSTEM AND METHOD FOR DYNAMIC GESTURE CONTROL FOR WORKLOAD MANAGEMENT IN A DEPLOYMENT

BACKGROUND

Devices may generate information based on existing information. For example, devices may obtain information and derive information based on the obtained information. To obtain information, devices may be able to communicate with other devices. The communications between the devices may be through any means.

SUMMARY

In general, in one aspect, the invention relates to a method for managing a deployment. The method includes obtaining a gesture sequence, wherein the gesture sequence comprises a gesture component, identifying a workflow associated with the gesture component using a gesture mapping, wherein the gesture mapping specifies a mapping between the gesture component and the workflow, identifying a target asset of the gesture component, wherein the target asset is part of the deployment, and applying the workflow to the target asset.

In general, in one aspect, the invention relates to a non-transitory computer readable medium that includes computer readable program code, which when executed by a computer processor enables the computer processor to perform a method for managing a deployment. The method includes obtaining a gesture sequence, wherein the gesture sequence comprises a gesture component, identifying a workflow associated with the gesture component using a gesture mapping, wherein the gesture mapping specifies a mapping between the gesture component and the workflow, identifying a target asset of the gesture component, wherein the target asset is part of the deployment, and applying the workflow to the target asset.

In general, in one aspect, the invention relates to a system that includes a processor and memory that includes instructions, which when executed by the processor, perform a method. The method includes obtaining a gesture sequence, wherein the gesture sequence comprises a gesture component, identifying a workflow associated with the gesture component using a gesture mapping, wherein the gesture mapping specifies a mapping between the gesture component and the workflow, identifying a target asset of the gesture component, wherein the target asset is part of the deployment, and applying the workflow to the target asset.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 2.1 shows a diagram of an example asset collection in accordance with one or more embodiments of the invention.

FIG. 2.2 shows a diagram of an asset in accordance with one or more embodiments of the invention.

FIG. 2.3 shows a diagram of an asset mapper in accordance with one or more embodiments of the invention.

FIG. 2.4 shows a diagram of a client in accordance with one or more embodiments of the invention.

FIG. 4.1 shows a flowchart of a first method of maintaining an asset map when an asset is added to a deployment in accordance with one or more embodiments of the invention.

FIG. 4.2 shows a flowchart of a second method of maintaining an asset map when an asset is added to a deployment in accordance with one or more embodiments of the invention.

FIG. 4.3 shows a flowchart of a method for managing workloads using gesture sequences in accordance with one or more embodiments of the invention.

FIGS. 5.1-5.3 shows a diagram of an example system at a first point in time.

DETAILED DESCRIPTION

Figure 3:
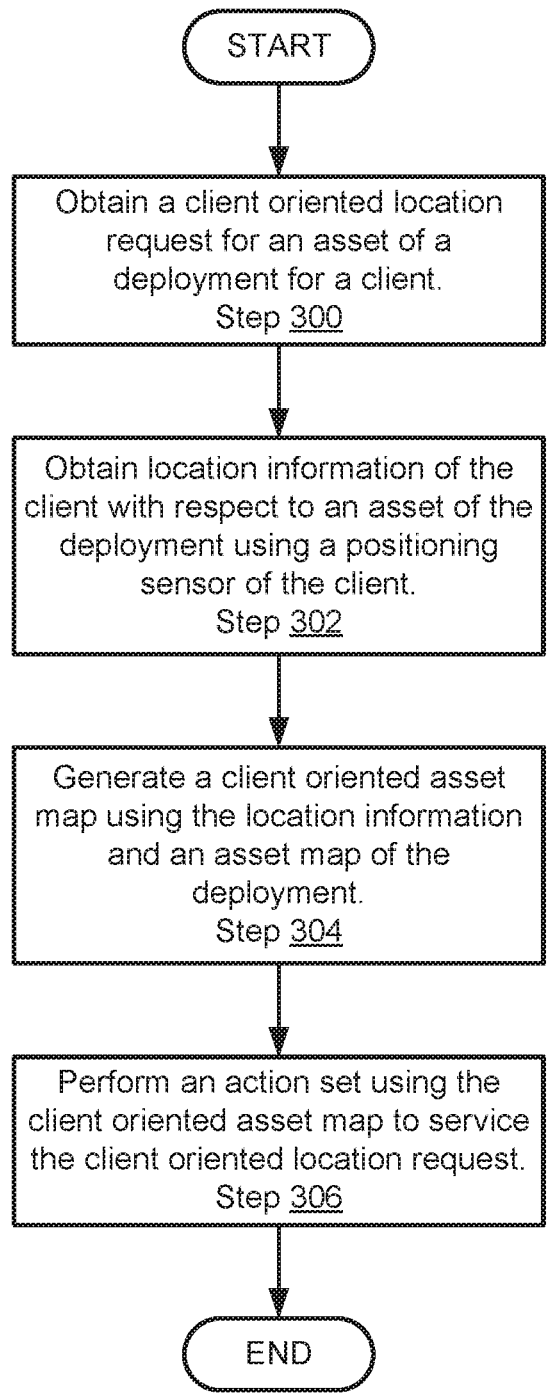
FIG. 3 shows a flowchart of a method of managing a deployment in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing deployments. A deployment may include any number of assets. An asset may be a collection of hardware devices that hosts applications and/or stores data. The assets of the deployment may cooperate to provide functionalities of the deployment.

Embodiments of the invention manage the deployments by managing workloads operating on the assets. For example, workloads may need to be prioritized (e.g., to be executed first in a queue), migrated to other assets, shut down, etc. The management of these workloads may be performed more efficiently on-site (e.g., in the data center hosting the assets). Embodiments of the invention may include performing gesture sequences on the assets and utilizing a gesture mapper to map the gesture sequences to workflows. The workflows may specify a series of tasks to be performed on the workloads. Embodiments of the invention may enable a user (e.g., a person) to perform gestures to the assets and to map the gestures to the workflows that may be used to manage the workloads on the assets.

FIG. 1.1 shows a system in accordance with one or more embodiments of the invention. The system may include a deployment (100) that provides computer implemented services. The computer implemented services may include, for example, database services, data storage services, electronic communications services, and/or other types of services that may be implemented using computing devices.

To provide the computer implemented services, the deployment (100) may utilize computing resources provided by hardware devices. The computing resources may include, for example, processing resources, storage resources, memory resources, and/or communications resources provided by the hardware devices.

The hardware devices of the deployment may be logically and/or physically divided into assets (106, 109). An asset may include a portion of the hardware devices of the deployment (100) and an enclosure for storing the portion of the hardware devices. An enclosure may be, for example, a rack mountable chassis or another type of form factor compliant enclosure. Different assets may include different types and/or number of hardware devices. Consequently, different assets may provide different types and quantities of computing resources.

For example, an asset may include a computing device disposed in a chassis. The computing device may include a processor, memory module, storage device, communications processor, and/or other types of hardware devices. For additional details regarding computing devices, refer to FIG. 6. The aforementioned asset may provide a combination of processing resources, memory resources, storage resources, etc. However, other assets may be adapted to only provide a single type of computing resources, e.g., storage resources, memory resources, etc., by including only a limited number and type of hardware devices.

To enable the assets to be arranged with respect to each other, the assets of the deployment (100) may be arranged into asset collections (102). The assets may be arranged into any number of asset collections (e.g., 104, 108). Different asset collections may include different numbers and/or types of assets.

An asset collection (e.g., 104, 108) may include any number of assets arranged in a predetermined manner. For example, an asset collection may include a rack used to arrange a number of assets having rack mountable chassis into a predetermined arrangement (e.g., vertically stacked). The asset collections (102) may use devices other than racks to arrange the assets without departing from the invention. For additional details regarding asset collections, refer to FIGS. 2.1-2.2.

The asset collections (102) may be disposed at predetermined locations within the deployment (100). For example, the asset collections may be arranged into rows or other organizational schemes.

Due to the number of assets (106), the number of hardware devices of each of the assets, and the arrangement of the assets as part of assets collections (102), it may be time consuming and/or difficult to identify particular assets of a deployment. For example, consider a scenario where a deployment includes 100 asset collections implemented as racks and each of the racks includes 12 assets implemented as rack mount chassis disposed in the racks of the asset collections. In such a scenario, when a hardware failure occurs, it may be difficult to identify any particular asset within the deployment due to the uniform physical appearance of the assets and asset collections which greatly complicates remedying of the hardware failure.

Embodiments of the invention may provide systems and methods for facilitating identification of assets of a deployment. Specifically, embodiments of the invention may provide a method for dynamically mapping the location of assets with respect to the location and/or orientation of an observer. By mapping the location of the assets with respect to the location and/or orientation of the observer, the cognitive burden placed on an observer for identifying the location of a particular asset may be greatly reduced. For example, by mapping the locations of the assets with respect to the observer, the observer may more intuitively identify the locations of the assets. In one or more embodiments of the invention, maps of the assets of a deployment are referred to as an asset map and an asset map that is oriented with respect to an observer is referred to as a client oriented asset map.

By reducing the cognitive burden on users for identifying assets of a deployment using a client oriented asset map of the deployment, the accuracy of asset identification may be improved thereby improving the uptime and/or performance of the deployment (100). For example, by improving the accuracy of identifying an asset, the time required to resolve hardware, software, and/or other types of issues that may impact the performance of the deployment (100) may be reduced.

To provide the aforementioned functionality, a system in accordance with embodiments of the invention may include assets (106) that identify their position, orientation, and/or other telemetry information with respect to other assets. To do so, each of the assets may include location awareness sensors that may be used to identify the relative position of an asset with respect to the position of another asset. For additional details regarding assets, refer to FIGS. 2.1-2.2.

The position, orientation, and/or other telemetry information may be used to generate and/or maintain a map of the assets (e.g., an asset map) of the deployment (100). The map of the deployment (100) may specify, for example, the relative position of each of the assets with respect to the other assets. The map of the assets may be generated and/or maintained by an asset mapper (120).

The map of the assets of the deployment (100) may also be generated using descriptions of the arrangement of the assets of the deployment. For example, when a deployment is deployed, a description of the assets included in each of the asset collections may be generated. The aforementioned description of the assets of the deployment (100) may be used to improve the quality (e.g., accuracy, precision, etc.) of asset maps and/or determinations regarding the relative position of an observer, discussed below. For example, the description of the assets may be used to determine whether determinations regarding the location, orientation, and/or other telemetry information are likely to be accurate. In other words, whether the determinations regarding the positions and/or orientations of the assets are consistent with the description of the assets.

For example, due to the arrangement of assets as part of an asset collection, a description of the assets may specify that the assets of an asset collection should be similarly positioned with respect to a particular asset (e.g., an asset facing a rack of assets). Accordingly, if the determinations regarding the locations and/or orientations of the assets indicates that the assets of the asset collections are not located in the same relative position with respect to an asset, the determinations regarding the locations and/or orientations of the assets may be determined to be inaccurate.

To dynamically map the location and/or orientation of an observer with respect to the assets of the deployment (100), an observer (e.g., a person such as a technician or deployment administrator) may utilize a client (130). A client (130) may be a device (physical or virtual) operated by an observer (e.g., an administrator, a technician, etc.) that desires to identify particular assets of a deployment. The client (130) may identify the position, orientation, and/or other telemetry information of the user of the client (130) (e.g., an observer) with respect to one or more of the assets of the deployment (100). To do so, the client (130) may include location awareness sensors that may be used to identify the relative position of the client (130) with respect to one or more of the assets (106).

The client (130) may provide the aforementioned telemetry information to other entities or use the telemetry information to otherwise obtain a client oriented asset map of the deployment. Using the client oriented asset map, the client (130) may provide information to the observer that enables the observer to more easily identify assets of the deployment. For example, the client (130) may generate visualizations regarding the assets of the deployment or other types of displays or interactive visualizations which the observer may utilize to identify assets or otherwise better understand the topology of the deployment. For additional details regarding the client (130), refer to FIG. 2.4.

As noted above, the position, orientation, and/or other telemetry information of the client (130) with respect to the assets (106) may be used to dynamically generate and/or maintain a map of the assets of the deployment (100) with respect to the position and/or orientation of the observer. In other words, the telemetry may be used to generate a client oriented asset map. The map of the assets relative to the observer may be generated and/or maintained by the asset mapper (120). Similarly, the asset mapper (120) may maintain an asset map of the deployment using similar information (e.g., location/orientation/other telemetry information) regarding the assets of the deployment. For additional details regarding the asset mapper (120), refer to FIG. 2.3.

The components of the system of FIG. 1.1 may be operably connected to each other and/or other entities via any combination of wired and/or wireless network. For example, the aforementioned components may each be operably connected to a network (110) that facilitates communications between these components.

The deployment (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment (100) described in this application and/or all, or a portion, of the methods illustrated in FIGS. 3-4.3. The deployment (100) may be implemented using other types of computing devices without departing from the invention. For additional details regarding computing devices, refer to FIG. 6.

The deployment (100) may be implemented using logical devices without departing from the invention. For example, the deployment (100) may be implemented using virtual machines that utilize computing resources of any number of physical computing devices (e.g., refer to FIG. 6) to provide their respective functionalities. The deployment (100) may be implemented using other types of logical devices without departing from the invention.

In one or more embodiments of the invention, the deployment (100) provides any number of computer implemented services. The computer implemented services may include, for example, file storage services, database services, electronic communication services, etc. The deployment (100) may provide other types of computer implemented services without departing from the invention. Each of the assets (e.g., 106, 109) of the deployment (100) may provide similar and/or different computer implemented services.

The asset mapper (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset mapper (120) described in this application and/or all, or a portion, of the methods illustrated in FIGS. 3-4.2. The asset mapper (120) may be implemented using other types of computing devices without departing from the invention. For additional details regarding computing devices, refer to FIG. 6.

The asset mapper (120) may be implemented using logical devices without departing from the invention. For example, the asset mapper (120) may be implemented using virtual machines that utilize computing resources of any number of physical computing devices (e.g., refer to FIG. 6) to provide their respective functionalities. The asset mapper (120) may be implemented using other types of logical devices without departing from the invention.

While illustrated as a separate entity, the functionality of the asset mapper (120) may be implemented via the client (130) and/or the assets (106, 109) of the deployment (100). For example, the asset mapper (120) may be implemented as a distributed application that executes using the computing resources of the other components of the system of FIG. 1.1 and/or computing resources of other entities not illustrated in FIG. 1.1.

In one or more embodiments of the invention, the asset mapper (120) provides mapping services. Mapping services may include generating of asset maps of deployments and/or client oriented asset maps and/or providing asset maps and/or client oriented asset maps. To generate such maps, the asset mapper (120) may obtain location information (e.g., relative position, orientation, and/or other telemetry information) regarding one or more of the assets (106, 109) and/or the client (130) with respect to each other. The aforementioned information may be utilized to generate the asset maps and/or client oriented asset maps.

The gesture mapper (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the gesture mapper (140) described in this application and/or all, or a portion, of the method illustrated in FIG. 4.3. The gesture mapper (140) may be implemented using other types of computing devices without departing from the invention. For additional details regarding computing devices, refer to FIG. 6.

The gesture mapper (140) may be implemented using logical devices without departing from the invention. For example, the gesture mapper (140) may be implemented using virtual machines that utilize computing resources of any number of physical computing devices (e.g., refer to FIG. 6) to provide their respective functionalities. The gesture mapper (140) may be implemented using other types of logical devices without departing from the invention.

While illustrated as a separate entity, the functionality of the gesture mapper (140) may be implemented via the client (140) and/or the assets (106, 109) of the deployment (100). For example, the asset mapper (140) may be implemented as a distributed application that executes using the computing resources of the other components of the system of FIG. 1.1 and/or computing resources of other entities not illustrated in FIG. 1.1.

In one or more embodiments of the invention, the gesture mapper (140) provides gesture mapping services. Gesture mapping services may include mapping gesture sequences to workflows. The gesture sequences may be gesture sequences detected by the assets using location awareness sensors (discussed below). The assets may send detected gesture sequences to the gesture mapper (140) to be translated to workload tasks to be executed by one or more assets.

In one or more embodiments of the invention, a gesture sequence is a series of gesture components performed by an asset collection administrator (e.g., person). The asset collection administrator may perform the gesture sequences using hand gestures. In one or more embodiments of the invention, a hand gesture is a motion performed by a person using, for example, any combination of the person's hand(s), fingers, thumb, palm, and/or any other part of the person without departing from the invention. Each motion may represent a gesture component. The order and combination of the gesture components may represent the gesture sequence.

Examples of gesture components may include, but are not limited to: (i) a circular motion by the person's finger, (ii) a swiping motion by a person's hand upward, downward, and/or sideways, a swipe upwards by the person's hand and/or index finger, (iii) a swiping motion by a person's index finger upward, downward, and/or sideways, (iv) a circular motion by the person's hand and/or index finger, and (iv) closing or opening of a person's hand.

As previously mentioned, each gesture component may be mapped to a workflow. A workflow may be a series of one or more workload tasks. Each workload task may be a task associated with workload management of the assets (106, 109). Each asset (106, 109) may include functionality to perform one or more workloads (discussed below). The workload task may specify, for example, (i) initiating or terminating a workload, (ii) grouping two or more workloads, (iii) increasing and/or decreasing a priority of a workload and/or a grouping of workloads, (iii) migration of a workload (or grouping of workloads) from one asset in an asset collection (e.g., 104) to a second asset in the same or a different asset collection (e.g., 108). The workload task may specify other types of tasks involving the workloads and/or the assets without departing from the invention.

In one or more embodiments of the invention, a workload is a process performed by an asset. The process may be in performed in response to data utilized by the client (130) and/or other entities not shown in FIG. 1.1. Examples of processes may include, but are not limited to, storage of data, deduplication operations, parity calculations, data transfer, execution of an instance of an application, and/or any other type of processing without departing from the invention.

In one or more embodiments of the invention, the gesture sequences vary based on a relative order in which the gesture components in the gesture sequences are performed. For example, consider a scenario in which workloads implemented in an asset are to be increased in priority. The first gesture component in the gesture sequence may be associated with a workload task that includes grouping the workloads that are displayed by the client (130) via, for example, a graphical user interface. The second gesture component in the gesture sequence may be associated with a workload task that includes increasing the priority of the previously-grouped workloads. In this manner, based on the relative order of the gesture components, the workloads are first selected as a group, then prioritized. The invention is not limited to the aforementioned example.

The client (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (130) described in this application and/or all, or a portion, of the methods illustrated in FIGS. 3-4.3. The client (130) may be implemented using other types of computing devices without departing from the invention. For additional details regarding computing devices, refer to FIG. 6.

The client (130) may be implemented using logical devices without departing from the invention. For example, the client (130) may be implemented using virtual machines that utilize computing resources of any number of physical computing devices (e.g., refer to FIG. 6) to provide their respective functionalities. The client (130) may be implemented using other types of logical devices without departing from the invention.

In one or more embodiments of the invention, the client (130) provides deployment information to observers. The deployment information may be provided to the client (130) through visualizations of the deployment (100) or other types of graphical user interfaces that enable observers to more easily identify assets of the deployment. For example, the client (130) may generate a graphical representation of the deployment keyed to the position and/or orientation of the client (130) with respect to the deployment, highlight the different assets within the deployment, and/or illustrate other types of information regarding the deployment.

In one or more embodiments of the invention, the client (130) initiates workload management of the assets (106, 109). Specifically, the client may obtain workflows to be performed on one or more workloads based on gestures obtained by the gesture mapper (140). The client (130) may further initiate those workflows by sending commands to the corresponding assets to perform the identified workflows (e.g., shutting down a workload on an asset, increasing priority of a group of workloads and migrating the group to a second asset, etc.).

While the system is illustrated in FIG. 1.1 as including a limited number of specific components, a system in accordance with embodiments of the invention may include additional, fewer, and/or different components from those illustrated in FIG. 1.1 and/or discussed above without departing from the invention.

As discussed above, the assets of the deployment of FIG. 1.1 may be arranged into asset collections. FIG. 2.1 shows a diagram of an example asset collection (200) in accordance with one or more embodiments of the invention. As discussed above, an asset collection may be a physical arrangement of assets (e.g., 202).

To arrange the assets (e.g., 202) of the example asset collection (200) with respect to each other, the example asset collection (200) may include a structural element such as, for example, a frame (210). A frame (210) may be a physical structure adapted to position and/or orient multiple assets within a predetermined space. For example, the frame (210) maybe implemented as a rack mount structure adapted to receive the chassis of the assets. When the assets are received by the frame (210), the assets (e.g., 202) may be reversibly locked in place with respect to each other.

For example, as illustrated in FIG. 2.1, the frame (210) may enable the assets (e.g., 202) to be vertically stacked with respect to the other assets (202). By doing so, the assets (e.g., 202) may be packed tightly with respect to each other and/or positioned and/or oriented in a predetermined with respect to each other. For example, as seen in FIG. 2.1, the assets may be stacked with respect to each other and orient a predetermined face of each asset.

The oriented predetermined face of each asset may include, for example, on or more location awareness sensors (204). The location awareness sensors (204) of the assets (e.g., 202) may enable the assets to ascertain the position, orientation, and/or other telemetry information with respect to each other. Further, the location awareness sensors (204) may include functionality to monitor and search for gesture sequences.

In one or more embodiments of the invention, the location awareness sensors are implemented as photonic sensors. A photonic sensor may be a device that utilizes electromagnetic radiation in an optical or near optical band to ascertain information regarding the environment in which the photonic sensor resides.

For example, a photonic sensor may include optical resonators, optical transceivers, data processors, and/or other types of hardware devices that are able to sense the position, orientation, and/or other telemetry information regarding other photonic sensors in the vicinity of the photonic sensor. By operating in an optical or near optical frequency band, the photonic sensor may obtain telemetry information without utilizing electromagnetic radiation in a frequency band used by the system of FIG. 1.1 for communication purposes. For example, the system of FIG. 1.1 may utilize one or more wireless network that operates between 1 Megahertz and 100 Gigahertz. In contrast, the photonic sensors may operate utilizing electromagnetic radiation having a frequency content above 300 Gigahertz. Consequently, the photonic sensors may be utilized to provide telemetry information without receiving interference due to communication by the system of FIG. 1.1. Similarly, the photonic sensors may operate without cause interference with communications by the system of FIG. 1.1.

The location awareness sensors (204) of each of the assets (202) may be operably coupled to computing resources of the respective assets. For additional details regarding the computing resources of the respective assets and utilization of the sensor data provided by the location awareness sensors (204), refer to FIG. 2.2.

While the example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.1 without departing from the invention.

As discussed above, an asset may include computing resources. The aforementioned resources may be used to host logical entities (e.g., programs, virtual entities). FIG. 2.2 shows a diagram of an asset (202) in accordance with one or more embodiments of the invention. The assets (106, 109) of FIG. 1.1 may be similar to the asset illustrated in FIG. 2.2.

As discussed above, an asset may provide computer implemented services as part of the deployment (100) and may obtain and provide positioning, orientation, and/or other types of telemetry information of the asset with respect to other assets. Additionally, the asset (202) may maintain a description of the asset. For example, the asset description (242) may specify hardware and software components of the asset (202). To provide the aforementioned functionality, the asset (202) may include an asset manager (230), location awareness sensors (204), and storage (240). Each of these components of the asset (202) are discussed below.

The asset manager (230) may be implemented using physical and/or logical devices. For example, the asset manager (230) may be implemented using computer readable instructions (e.g., program code) that when executed by the computing resources of the asset (202) give rise to the functionality of the asset manager (230). In another example, the asset manager (230) may be implemented using special purpose hardware devices such as, for example, programmable gate arrays, application specific integrated circuit, or another type of hardware device that provides the functionality of the asset manager (230) by including circuitry adapted to provide the aforementioned functionality. In a still further example, the asset manager (230) may be implemented using a combination of computer readable instructions (e.g., program code) and special purpose hardware devices.

The asset manager (230) may manage the operation of the asset (202). To manage the operation of the asset (202), the asset manager (230) may obtain data from the location awareness sensors (204), validate the obtained data by comparing it to other data obtained from the location awareness sensors (204), store the sensor data (244), and provide copies of the sensor data (244) to other entities. Further, the asset manager may manage the operation of the asset (202) by implementing workload tasks as requested by the gesture mapper. The workload tasks may specify managing the workloads executing on the asset (202) (e.g., increasing priority of a workload or a grouping of workloads, migrating a workload to a second asset, etc.). When providing the above noted functionality, the asset (202) may cooperate with other entities of the system of FIG. 1.1 to provide, for example, the functionality of the deployment, the asset mapper, and/or the client.

When providing the above noted functionality, the asset manager (230) may perform all, or a portion, of the methods illustrated in FIGS. 3-4.2.

The location awareness sensors (204) may be physical devices that provide sensing services. Sensing services may include (i) obtaining sensor data (e.g., measurements) and (ii) providing the sensor data to the asset manager (230) and/or other entities.

In one or more embodiments of the invention, the location awareness sensors (204) are implemented as photonic sensors (e.g., sensors that utilize electromagnetic radiation at optical and/or near optical frequencies) that are adapted to identify the location, orientation, and/or other telemetry information of other entities with respect to the location awareness sensors. To provide the aforementioned functionality, the location awareness sensors may include, for example, optical resonators, optical transceivers, data processors, and/or other types of hardware devices that are able to sense the position, orientation, and/or other telemetry information regarding other photonic sensors in the vicinity of the photonic sensor.

For example, the location awareness sensors (204) may (i) emit electromagnetic radiation and measuring the scattering of the electromagnetic radiation, (ii) measure electromagnetic radiation emitted by other location awareness sensors to identify a distance between the location awareness sensors and another entity, a direction with respect to the asset towards another entity, an orientation of the asset with respect to another entity, an orientation of another entity with respect to the asset, and/or other kinds of information describing the relative positioning and orientation of the asset with respect to other entities, and/or (iii) detect movement and/or motions of an object within the view of the location awareness sensors (204).

While the asset illustrated in FIG. 2.1 is illustrated as including a single location awareness sensor disposed on a single location of the asset, an asset may include any number of location awareness sensors disposed on any number of portions at any number of locations on the asset without departing from the invention.

When providing the above noted functionality, the location awareness sensors (204) may perform all, or a portion, of the methods illustrated in FIGS. 3-4.2.

In one or more embodiments of the invention, the storage (240) includes devices that provide data storage services (e.g., storing data and providing copies of previously stored data). The devices that provide data storage services may include hardware devices and/or logical devices. For example, the storage (240) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (240) may include a memory device (e.g., a dual in line memory device) in which data is stored and from which copies of previously stored data are provided. In another example, the storage (240) may include a persistent storage device (e.g., a solid state disk drive) in which data is stored and from which copies of previously stored data is provided. In a still further example, the storage (240) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (240) may store data structures including an asset description (242) and sensor data (244). Each of these data structures is discussed below.

The asset description (242) may be a data structure that includes information regarding the hardware, software, information regarding the environment in which the asset resides (e.g., network connectivity information, neighboring devices identified using proximity sensors, identifiers of frames or other structures in which the asset (202) is housed, etc.), and/or other aspects of the asset (202). The asset manager (230) may maintain the asset description (242) as aspects of the asset (202) change due to, for example, hardware, software, and/or changes in the environment proximate to the asset (202). For example, the asset manager (230) may modify the contents of the asset description (242) so that the asset description (242) includes up to date information regarding the asset (202).

The sensor data (244) may be a data structure include any quantity of data obtained from the location awareness sensors (204). For example, the sensor data (244) may include data reflecting measurements made by the location awareness sensors (204). The sensor data (244) may include any type and quantity of sensor data. As a second example, the sensor data (244) may include data reflecting detected gesture sequences, the gesture components, and/or any other data associated with the gesture sequences and/or gesture components. The other data may include, for example, an orientation relative to the asset (e.g., facing the asset, facing opposite the asset, at a 90 degree angle from the asset, etc.), a distance from the asset (202), a location of the gesture component and/or gesture sequence relative to the asset (202), and/or any other relevant data without departing from the invention.

While the storage (240) has been illustrated as including data structures including a limited amount of specific information, any of the data structures stored in the storage (240) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset (202) is illustrated in FIG. 2.2 as including a limited number of specific components, an asset in accordance with embodiments of the invention may include additional, fewer, and/or different components from those illustrated in FIG. 2.2 and/or discussed above without departing from the invention.

As discussed above, the asset mapper (120) of FIG. 1.1 may generate, maintain, and/or provide asset maps and/or client oriented asset maps. FIG. 2.3 shows a diagram of the asset mapper (120) in accordance with one or more embodiments of the invention.

The asset mapper (120) may provide mapping services for deployments. To provide the aforementioned functionality, the asset mapper (120) may include a map manager (250) and storage (240). Each of these components of the asset mapper (120) is discussed below.

The map manager (250) may be implemented using physical and/or logical devices. For example, the map manager (250) may be implemented using computer readable instructions (e.g., program code) that when executed by the computing resources of the map manager (250) give rise to the functionality of the map manager (250). In another example, the map manager (250) may be implemented using special purpose hardware devices such as, for example, programmable gate arrays, application specific integrated circuit, or another type of hardware device that provides the functionality of the map manager (250) by including circuitry adapted to provide the aforementioned functionality. In a still further example, the map manager (250) may be implemented using a combination of computer readable instructions (e.g., program code) and special purpose hardware devices.

The map manager (250) may provide the mapping services of the asset mapper (120). Mapping services may include (i) generating asset maps (264) using information obtained from assets (e.g., the positions and/or orientation of the assets with respect to each other) of a deployment and asset descriptions (262) and (ii) generating client oriented asset maps (266) using asset maps (264) and information obtained from clients (e.g., the position and/or orientation of a client with respect to at least one asset of a deployment). Such maps may be utilized by client or other entities to more efficiently and/or accurately identify the location of assets within a deployment. The maps may be utilized for other purposes without departing from the invention.

When providing the above noted functionality, the map manager (250) may perform all, or a portion, of the methods illustrated in FIGS. 3-4.2.

In one or more embodiments of the invention, the storage (260) includes devices that provide data storage services (e.g., storing data and providing copies of previously stored data). The devices that provide data storage services may include hardware devices and/or logical devices. For example, the storage (260) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (260) may include a memory device (e.g., a dual in line memory device) in which data is stored and from which copies of previously stored data are provided. In another example, the storage (260) may include a persistent storage device (e.g., a solid state disk drive) in which data is stored and from which copies of previously stored data is provided. In a still further example, the storage (260) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (260) may store data structures including asset descriptions (262), asset maps (264), and client oriented asset maps (266). Each of these data structures is discussed below.

The asset descriptions (262) may be a data structure that includes information regarding the assets of the deployment. For example, asset descriptions (262) may specify that assets that are included in each of the asset collections. In other words, the assets that are included in each of the racks or other organizational structures/asset enclosures of the deployment. The asset descriptions (262) may include additional, different, and/or less information regarding the assets of the deployments without departing from the invention.

The asset descriptions (262) may be implemented as, for example, a table where each row is associated with an asset collection and the columns of the row include identifiers of assets that are disposed in the asset collection associated with the row. The asset descriptions (262) may be maintained, at least in part, by, for example, an administrator, technician, and/or other persons. The asset descriptions (262) may be maintained, at least in part, by, for example, the assets and the map manager (250). For example, the assets may identify other assets operably connected to each other by a networking device of an asset enclosure. Based on the identification, the assets may determine that each of the connected assets is likely to be part of a similar asset collection. The assets may provide such information to the map manager (250) which, in turn, may update the asset descriptions (262) based on the information obtained from the assets.

The assets may provide other types of information to the map manager (250) regarding the likely member of the assets with respect to asset collections without departing from the invention. For example, the assets may utilize sensors to identify other assets that are in close proximity to other assets. Based on the identification, the assets may determine that, due to proximity, the assets are members of asset collections.

The asset maps (264) may be a data structure that includes asset maps of assets of deployments. The asset maps (264) may specify, for example, the relative position, orientation, and/or other information of assets with respect to other assets. The asset maps (264) may specify any amount of such information without departing from the invention.

The client oriented asset maps (266) may be a data structure that includes client oriented asset maps of assets of deployments that are keyed (e.g., oriented with respect to) a location and/or orientation of respective clients. The client oriented asset maps may be dynamically generated. The client oriented asset maps (266) may specify, for example, the relative position, orientation, and/or other information of assets with respect to the position and/or orientation of respective clients. The client oriented asset maps (266) may specify any amount of such information without departing from the invention.

While the storage (260) has been illustrated as including data structures including a limited amount of specific information, any of the data structures stored in the storage (260) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset mapper (120) is illustrated in FIG. 2.3 as including a limited number of specific components, an asset mapper in accordance with embodiments of the invention may include additional, fewer, and/or different components from those illustrated in FIG. 2.3 and/or discussed above without departing from the invention.

As discussed above, the client (130) of FIG. 1.1 may facilitate management of a deployment. FIG. 2.4 shows a diagram of the client (130) in accordance with one or more embodiments of the invention.

As discussed above, the client (130) may provide deployment management services. To provide the aforementioned functionality, the client (130) may include applications (270), location awareness sensors (204), a deployment manager (272), and storage (280). Each of these components of the client (130) is discussed below.

The applications (270) may be implemented using physical and/or logical devices. For example, the applications (270) may be implemented using computer readable instructions (e.g., program code) that when executed by the computing resources of the application (270) give rise to the functionality of the applications (270). In another example, the applications (270) may be implemented using special purpose hardware devices such as, for example, programmable gate arrays, application specific integrated circuit, or another type of hardware device that provides the functionality of the applications (270) by including circuitry adapted to provide the aforementioned functionality. In a still further example, the applications (270) may be implemented using a combination of computer readable instructions (e.g., program code) and special purpose hardware devices.

The applications (270) may provide any number of computer implemented services for managing a deployment (and/or providing other types of services). The computer implemented services may include (i) analyzing asset maps and/or client oriented asset maps to identify whether particular assets are present in a deployment, (ii) analyzing asset maps and/or client oriented asset maps to identify whether hardware and/or software components of a deployment should be replaced, updated, or otherwise modified, (iii) managing workloads operating on assets of the deployment, and/or (iv) other services to facilitate management of deployments. When providing computer implemented services, the applications (270) may generate application data (282) that reflects the services provided by the applications (270).

When the applications (270) provide their functionality, the application (270) and/or other entities may invoke the functionality of the deployment manager (272), discussed below. For example, one or more of the applications (270) may invoke the functionality of the deployment manager (272) may sending a request for a visualization of the deployment. In response, the deployment manager (272) may obtain a client oriented asset map, that is keyed to the location and/or orientation of the client (130), for the deployment and generate a visualization or other representation of the deployment using the client oriented asset map. To do so, the deployment manager (272) may invoke the functionality of the location awareness sensors (204) to identify the location and/or orientation of the client (130) with respect to an asset of the deployment. The location and/or orientation of the client (130) may be used in combination with an asset map of the deployment to generate a client oriented asset map.

When providing the above noted functionality, the applications (270) may perform all, or a portion, of the methods illustrated in FIGS. 3-4.3.

The deployment manager (272) may be implemented using physical and/or logical devices. For example, the deployment manager (272) may be implemented using computer readable instructions (e.g., program code) that when executed by the computing resources of the deployment manager (272) give rise to the functionality of the deployment manager (272). In another example, the deployment manager (272) may be implemented using special purpose hardware devices such as, for example, programmable gate arrays, application specific integrated circuit, or another type of hardware device that provides the functionality of the deployment manager (272) by including circuitry adapted to provide the aforementioned functionality. In a still further example, the deployment manager (272) may be implemented using a combination of computer readable instructions (e.g., program code) and special purpose hardware devices.

The deployment manager (272) may provide deployment visualization services. Deployment visualization services may include (i) obtaining and providing sensor data (e.g., location information of the client with respect to one or more assets) from the location awareness sensors (204), (ii) obtaining one or more client oriented asset maps (286), associated with respective deployments, that are based, at least in part, on the provided sensor data, and (iii) generating visualizations of deployments using the client oriented asset maps (286). Such visualizations may be utilized by clients or other entities to more efficiently and/or accurately identify the location of assets within a deployment. The maps may be utilized for other purposes without departing from the invention.

In one or more embodiments of the invention, the deployment visualization services are used during the workload management. The deployment manager (272), in providing the deployment visualization services, may allow a user (e.g., a person) operating the client to select assets in the deployment displayed in the visualization and manage the workloads of the selected assets. The workloads may be managed by performing gesture sequences on the location awareness sensors (e.g., 204) located on the client. In such manner, the workloads may be managed at the location of the assets or remotely from the assets.

When providing the above noted functionality, the deployment manager (272) may perform all, or a portion, of the methods illustrated in FIGS. 3-4.2.

The location awareness sensors (204) may be similar to the location awareness sensors (204) described with respect to FIG. 2.2. For example, the location awareness sensors (204) may generate sensor data (284). The deployment manager (272) may utilize the location awareness sensors (204) (e.g., take measurements using the location awareness sensors) to identify a relative location and/or orientation of the client (130) with respect to one or more assets of the deployment. The position and/or orientation of the client (130) may be used to define a point of view of client oriented asset maps. In other words, the client oriented asset maps generated using the position and/or orientation of the client (130) may be oriented with respect to the position/orientation.

In one or more embodiments of the invention, the storage (280) includes devices that provide data storage services (e.g., storing data and providing copies of previously stored data). The devices that provide data storage services may include hardware devices and/or logical devices. For example, the storage (280) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (280) may include a memory device (e.g., a dual in line memory device) in which data is stored and from which copies of previously stored data are provided. In another example, the storage (280) may include a persistent storage device (e.g., a solid state disk drive) in which data is stored and from which copies of previously stored data is provided. In a still further example, the storage (280) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (280) may store data structures including application data (282), sensor data (284), and client oriented asset maps (286). Each of these data structures is discussed below.

The application data (282) include one or more data structures that include data generated and/or utilized by the applications (270). The application data (282) may include any quantity and/or type of data.

The sensor data (284) may include one or more data structures that include data obtained using the location awareness sensors (204). In other words, data regarding the position and/or orientation of the client (130) with respect to an asset of a deployment. The sensor data (284) obtained using the location awareness sensors (204) of the client (130) may be used in combination with one or more asset maps to generate one or more of the client oriented asset maps (286).

The client oriented asset maps (286) may include one or more data structures that include client oriented asset maps. As discussed above, a client oriented asset map may specify the location and/or orientation of assets of a deployment with reference to the position and/or orientation of the client (130) with respect to the assets of the deployment. The client oriented asset maps (286) may be utilized by the applications (270) and/or the deployment manager (272) to provide information to a user of the client that may enable the user of the client (130) to more efficiently identify assets of the deployment.

While the storage (280) has been illustrated as including data structures including a limited amount of specific information, any of the data structures stored in the storage (280) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the client (130) is illustrated in FIG. 2.4 as including a limited number of specific components, a client in accordance with embodiments of the invention may include additional, fewer, and/or different components from those illustrated in FIG. 2.4 and/or discussed above without departing from the invention.

As discussed above, the system of FIG. 1.1 may provide deployment management services. FIGS. 3-4.2 show methods that may be performed by components of the system of FIG. 1.1 to provide deployment management services.

FIG. 3 shows a flowchart of a method in accordance with one or more embodiments of the invention. The method depicted in FIG. 3 may be used to respond to client oriented location requests in accordance with one or more embodiments of the invention. The method shown in FIG. 3 may be performed by, for example, an asset mapper (e.g., 120, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a client oriented location request for an asset of a deployment for a client is obtained. The client oriented location request may be a request for information to be provided that may enable the location of the asset of the deployment to be efficiently identified.

In one or more embodiments of the invention, the client oriented location request is a specific request for information specifying the location of a particular asset. In other words, where an asset resides in a deployment.

In one or more embodiments of the invention, the client oriented location request is for a map of assets of the deployment in proximity to a client. For example, a technician, administrator, or other personnel may be near a portion of the deployment and is requesting information that may enable the user of the client to efficiently identify the assets that are proximate to the client.

In step 302, location information of the client with respect to an asset of the deployment is obtained using one or more location awareness sensors of the client. The location information may be obtained by invoking the functionality of the location awareness sensors of the client. Invoking the functionality of the location awareness sensors may, for example, cause the location awareness sensors to generate and/or sense electromagnetic radiation in and/or near an optical frequency band. The emitted and sensed electromagnetic radiation may be utilized to estimate a location and/or orientation of an asset nearest to the client.

When emitting and/or sensing electromagnetic radiation, the location awareness sensors of the client may cooperate with location awareness sensors of the asset. For example, the location awareness sensors on each of the aforementioned devices may emit electromagnetic radiation at predetermined times, in predetermined patterns, and/or in other manners adapted to enable the position and/or orientation of the client with respect to the asset to be determined.

After the aforementioned sensor data is obtained, the sensor data may be validated by obtaining similar position and/or orientation information with respect to a second asset that is generally collocated with the asset. For example, the second asset may be part of the same asset collection as the asset from which the first sensor data was obtained. The second asset may be identified based on asset descriptions (262) described with respect to FIG. 2.3.

In step 304, a client oriented asset map is generated using the location information and an asset map of the deployment. The client oriented asset map may be generated by shifting a reference point/orientation of the asset map to position/orient the asset map with respect to the client. For example, the 0, 0 of the asset map may be shifted so that the location of the client is the 0, 0 point. The asset map may also be rotated or otherwise manipulated to orient the asset map with respect to the orientation of the client. By doing so, visualizations of the deployment with respect to the location and/or orientation of the client may be efficient generated by virtue of the client oriented asset map being keyed to the location of the client.

For example, consider a scenario where an asset map is keyed to a component of an asset that is south of the location of the client within the deployment. In such a scenario, the positions of the assets with the respected to the keyed asset may be modified to shift the keyed location to the location of the client.

To generate the client oriented asset map, linear transformations or other tools for mapping the relative locations/orientations of the assets included in the asset map may be applied to the information included in the asset map to generate the client oriented asset map. For example, a linear transformation (e.g., position/orientation transformation) may be generated based on the location information obtained from the client.

In step 306, an action set is performed using the client oriented asset map to service the client oriented location request.

In one or more embodiments of the invention, the action set includes generating and displaying a visualization of the deployment with respect to the position and/or orientation of the client. For example, the visualization may include a representation of asset collections of the deployment (e.g., racks or other structures) and the assets of each of the asset collections (e.g., rack mount chassis housing components) that would be within a field of view of a person having a similar location and/or orientation of the client.

The visualizations may also include, for example, indicators that highlight one or more of the assets and/or indicators of identifiers of the assets. Such information may be used to reduce the cognitive burden on personnel tasked with identifying the assets of the deployment.

The visualizations may be dynamically generated. In other words, the visualizations may change depending on the position and/or orientation of the client. By doing so, the personnel may utilize the client to efficiently scan a deployment for relevant assets.

The visualization may be generated using, for example, one or more client oriented asset maps and/or other information such as a description of assets of a deployment. The description of the assets of the deployment may be utilized to generate a rendering of the asset collections.

For example, the description of the assets may indicate a type of frame, housing, or other structure utilized to house the assets of the asset collection. The type of frame, housing, or other structure may be matched to a library of pre-rendered representations of such frames, housing, or other structures. The pre-rendered representations may be position and/or orientation dependent. Consequently, pre-rendered representations of the frame, housing, or other structures for each potential position and/or orientation of the client (in other words, view angle/view position) with respect to each asset collection may be obtained.

Similarly, the description of the assets may indicate a type of chassis utilized by each of the assets of the asset collection. Pre-rendered representations (similar to those of the frame, housing, or other structure) of the chassis may also be available.

The representations of the asset collections may be generated using the pre-rendered representations of the assets and/or the frames, housing, or other structures used to house the assets of the asset collection. The representations of the asset collections may be used to generate a visualization of the deployment from a point of view of the client.

The visualization of the deployment may be generated via other methods without departing from the invention.

Once rendered, the visualization may be, for example, displayed to a user of a client, provided to an application, or integrated into a graphical user interface of an application. The aforementioned graphical elements may be displayed to the user of the client and/or other users (e.g., personnel disposed at other locations) via displays of the aforementioned devices.

In one or more embodiments of the invention, the visualization is a three dimensional depiction of a portion (or all) of the deployment. The visualization may be a two dimensional depiction of a portion (or all) of the deployment without departing from the invention. For example, the visualization may be a top down view of the deployment and include an icon representing the location of the client within the environment. Additionally, the field of view from the location of the client may indicated in the depiction (e.g., a shaded area or other visual indicator may be used to indicate the field of view).

In one or more embodiments of the invention, the visualization is interactive. For example, the portions of the visualization corresponding to assets may be interacted with by clicking (using, for example, a pointing device such as a mouse), touching (if, for example, the client includes a touch sensitive display), or otherwise selecting using input-output functionality of the client. Upon being interacted with, additional information regarding the corresponding asset may be displayed. For example, a description of a location of the asset within an asset collection (e.g., the second rack from the top, the third rack from the bottom, etc.) may be displayed as a superimposed overlay.

The method may end following step 306.

Using the method illustrated in FIG. 3, a system in accordance with embodiments of the invention may provide information that may enable assets of a deployment to be efficient identified. The information provided may include visualizations of the deployment with additional information that is not present in the deployment. For example, highlights of assets and corresponding identifiers of assets may be provided as part of visualizations of the deployment. The aforementioned highlights and identifiers may not be physically present in the deployment but, when present in the rendering, enable each of the assets of the deployment to be efficiently identified.

As discussed with respect to FIG. 1.1, the system of FIG. 1.1 may maintain asset maps of deployment to provide deployment management services. FIGS. 4.2 and 4.3 illustrate methods that may be used to maintain asset maps of deployments.

FIG. 4.1 shows a flowchart of a method in accordance with one or more embodiments of the invention. The method depicted in FIG. 4.1 may be used to maintain an asset map when an asset is added to a deployment in accordance with one or more embodiments of the invention. The method shown in FIG. 4.1 may be performed by, for example, an asset (e.g., 106, FIG. 1.1). Other components of the system in FIG. 1.1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a network that includes assets is identified. For example, the network may be a peer to peer network maintained by assets of a deployment. The peer to peer network may, for example, be a gossip network. The network may be other types of networks without departing from the invention.

The network may be identified using communications resources of the asset. For example, the asset may include hardware components such as transceivers adapted to send and receive data via a wireless network. The wireless network may support the network utilized by the assets to communicate with one another.

In step 402, an identity of the asset is provided to the assets of the deployment using the network. For example, the identity may be provided by transmitting the identity to the assets using the network. The identity of the asset may be correlated with an asset description of the deployment.

In step 404, location information with respect to the assets is provided using one or more location awareness sensors. The location information may be obtained similarly to that obtained by the client as described with respect to FIG. 3. The location information may also be provided to an asset mapper.

In step 406, an asset map of the deployment is updated based on the location information. The location information may be added to the asset map or used to modify an existing portion of the asset map to update the asset map.

For example, when an asset is moved within the deployment, the asset may be depowered causing the asset to be removed from a network of the deployment. When the asset is powered on or a new asset is added, the asset may automatically join the network which causes the asset to perform the method illustrated in FIG. 4.1.

The asset map may be updated by an asset mapper that provides mapping services for the deployment.

The method may end following step 406.

Using the method illustrated in FIG. 4.1, a system in accordance with embodiments of the invention may maintain an asset map of a deployment as assets are added to or relocated within the deployment.

FIG. 4.2 shows a flowchart of a method in accordance with one or more embodiments of the invention. The method depicted in FIG. 4.2 may be used to maintain an asset map when an asset is added to a deployment in accordance with one or more embodiments of the invention. The method shown in FIG. 4.2 may be performed by, for example, an asset or and asset mapper (e.g., 106, 120, FIG. 1.1). Other components of the system in FIG. 1.1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, an asset that has joined a network of a deployment is identified. The asset may be identified using an identifier of the asset provided by the asset via the network. For example, the asset may notify other entities on the network of the identity of the asset when the asset joins the network.

In step 422, it is determined whether the asset is a member of the deployment. The determination may be made by comparing the identifier of the asset to a description of the assets of the deployment. In other words, the identifier may be matched to similar identifiers included in the description of the assets of the deployment. If the identifier is matched to an identifier specified by the description of the assets, the asset may be determined as being a member of the deployment. If the identifier does not match any identifier specified by the description of the assets, the asset may be determined as not being a member of the deployment.

The determination may be made via other methods without departing from the invention. For example, a listing of hardware, software, and/or other components of the asset may be matched to similar descriptions of the hardware, software, and/or other components of members of the deployment.

If it is determined that the asset is a member of the deployment, the method may proceed to step 424. If it is determined that the asset is not a member of the deployment, the method may end following step 422. For example, the asset may be kicked of the network or otherwise not allowed to join the deployment following step 422.

In step 424, location information of the asset with respect to other assets of the deployment is obtained using one or more location awareness sensors. The location information may be obtained similarly to that obtained by the client as described with respect to FIG. 3. The location information may also be provided to an asset mapper.

In step 426, an asset map of the deployment is updated based on the location information. The location information may be added to the asset map or used to modify an existing portion of the asset map to update the asset map.

The asset map may be updated by an asset mapper that provides mapping services for the deployment.

The method may end following step 4.2.

Using the method illustrated in FIG. 4.2, a system in accordance with embodiments of the invention may maintain an asset map of a deployment as assets are added to or relocated within the deployment.

In addition to the above methods, the system of FIG. 1.1 may monitor the location of assets within a deployment and maintain a corresponding asset map based on the monitoring. The location awareness sensors of the assets may be used to identify changes in the positions and/or orientations of the assets based on changes in sensor data.

For example, when assets are repositioned within the deployment, the signal level of electromagnetic radiation measured by a first location awareness sensor when a second location awareness sensor radiates electromagnetic radiation. Such changes may cause the system of FIG. 1.1 to use the sensors to obtain location information to update the asset map.

Similarly, when an asset leaves or otherwise becomes unavailable on a network for a period of time, the system of FIG. 1.1 may automatically attempt to obtain location information using location awareness sensors of the asset. The asset map may be corresponding updated based on the obtained location information (e.g., if sensor data cannot be obtained because the asset has been removed, the asset may be similarly removed from the asset map).

As the asset map is updated, historical information regarding the asset map may be maintained. For example, the asset map may be implemented using a data structure that includes changes to the asset map. Changes to the asset map may be time stamped or otherwise marked to indicate the periods of time during which the changes to the deployment occurred. Consequently, changes to the deployment and/or the state of the deployment at previous points in time may be identified using the information included in the asset map.

FIG. 4.3 shows a flowchart of a method in accordance with one or more embodiments of the invention. The method depicted in FIG. 4.3 may be used to manage workloads using gesture sequences in accordance with one or more embodiments of the invention. The method shown in FIG. 4.2 may be performed by, for example, an asset, a client, and/or a gesture mapper (e.g., 106, 120, 140, FIG. 1.1). Other components of the system in FIG. 1.1 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

Turning to FIG. 4.3, in step 440, a gesture sequence is detected. In one or more embodiments of the invention, the gesture sequence is detected using one or more location awareness sensors of the asset. The location awareness sensors may frequently search for motion and, when a motion is identified, determine that the motion is associated with a gesture component. The location awareness sensors may group gesture components performed in parallel and identify the relative order in which the gesture components were performed and detect the relative order and group of gesture components as a gesture sequence.

In step 442, a gesture component of the gesture sequence is selected.

In step 444, a workflow associated with the gesture component is identified using a gesture mapping. In one or more embodiments of the invention, if the method of FIG. 4.3 is performed by the asset or the client, the gesture sequence is sent to a gesture mapper so that the gesture sequence may be mapped to one or more workflows. The gesture mapper, using a gesture mapping, identifies the workflow associated with the selected gesture component. The gesture mapper may send the identified workflow to the entity performing the method of FIG. 4.3 (e.g., the client or the asset).

In step 446, target asset(s) of the gesture component are identified using one or more location awareness sensors. In one or more embodiments of the invention, the location awareness sensors are equipped to identify a location, a distance, and/or orientation of each gesture component. The location, distance, and/or gesture component may be analyzed to identify the asset to which the gesture component was intended. Further, the gesture mapper (or other entity implementing the method of FIG. 4.3) may utilize the sensor data of other assets to identify such asset.

For example, consider a scenario in which a gesture component is detected by location awareness sensors in assets A, B, and C. Asset A may measure the gesture component to be five meters from Asset A, Asset B may measure the gesture component to be ten meters from Asset B, and Asset C may measure the gesture component to be one meter from Asset C. The gesture mapper may make the determination that the target asset of the gesture component is Asset C because the gesture component is closest to Asset C.

In one or more embodiments of the invention, the target assets may be a group of assets collocated in the same frame (e.g., 210, FIG. 2.1). The gesture component may include selecting all workloads of all assets in the frame (e.g., by using a finger to perform a circular motion that specifies selecting all or a portion of assets in the frame).

In step 448, the workflow is applied to the target asset. In one or more embodiments of the invention, the workflow identified in step 444 is sent to the asset to be implemented on one or more workloads executing on the asset. The asset, in response to obtaining the workflow, may implement the workload tasks specified in the workflow on the specified workloads.

In one or more embodiments of the invention, if the method of FIG. 4.3 is performed by the client, and the location awareness sensor is located on the client and remotely from the deployment, the target asset(s) are identified based on the asset(s) displayed by the client. For example, a client may display, using the deployment visualization services discussed above, a visualization of the deployment. The visualization may include one or more assets. In such embodiment, the sensor data is not needed for identifying the target asset(s). Instead, the target asset(s) are identified based on the asset(s) being displayed in the visualization by the client.

In step 450, the selected gesture component is marked as processed.

In step 452, a determination is made about whether all gesture components in the gesture sequence are processed. If all gesture components in the gesture sequence are processed, the method ends following step 452; otherwise, the method proceeds to step 442.

In another embodiment of the invention, the steps 442-452 (excluding step 448) may be performed for all gesture components in the gesture sequence. Once all of the workflows have been identified, step 448 is perform for all workflows in the relative order determined by the gesture sequence.

To further clarify embodiments of the invention, a non-limiting example is provided in FIGS. 5.1-5.3. FIG. 5.1 illustrates a system similar to that illustrated in FIG. 1.1. FIGS. 5.2-5.3 illustrate interactions between components and/or actions performed by the components of the system of FIG. 5.1 over time. For the sake of brevity, only a limited number of components of the system of FIG. 1.1 are illustrated in each of FIGS. 5.1-5.3.

Example

Consider a scenario as illustrated in FIG. 5.1 in which a deployment includes a data center organized into data center racks (572) that each house one or more assets. The assets (i.e., asset A, asset B, asset C, and asset D) are housed in data center chassis (574) and each include a location awareness sensor (576A, 576B, 576C, 576D). The location awareness sensors constantly monitor the movement of its surroundings to detect motion. In this example, each asset (i.e., asset A, asset B, asset C, asset D) is executing one or more workloads.

FIG. 5.2 shows a second diagram of the data center of FIG. 5.1 with a data center administrator (590) that is to shut down operation of asset A for maintenance purposes. The data center administrator (590) is a person that manages the operation of the assets (i.e., asset A, asset B, asset C, and asset D). Prior to shutting down operation of asset A, the data center administrator (590) performs a gesture sequence (591) for the purpose of migrating workloads from asset A to asset B. The gesture sequence (591) includes two gesture components (591A, 591B). Each gesture component (591A, 591B) in the gesture sequence (591) is performed by a finger of the data center administrator.

Gesture component A (591A) includes using a finger to perform a circular motion near asset A. Gesture component B (591B) includes using the finger to perform a swiping motion upwards near asset A. The data center administrator (591) may stand in front of the data center rack housing asset A and perform the gesture sequence (591).

Continuing with the discussion of FIG. 5.2, FIG. 5.2 shows a top view of the data center racks (572) and the data center administrator (590) positioned in front of and facing asset A. The data center administrator (591) performs the gesture sequence (591) in this orientation and direction.

As illustrated in FIG. 5.2, each location awareness sensor (576A, 576B, 576C, 576D) detects the gesture sequence. The location awareness sensors (576A, 576B, 576C, 576D)

may store sensor data in their respective assets that specifies a location, distance from the asset, and orientation of the gesture sequence (591). Location awareness sensor D (576D) measures a distance of 2.5 meters between asset D and the location at which the gesture sequence (591) was performed, location awareness sensor A (576A) measures a distance of 0.5 meters between asset A and the location at which the gesture sequence (591) was performed, location awareness sensor C (576C) measures a distance of 0.75 meters between asset C and the location at which the gesture sequence (591) was performed, and location awareness sensor B (576B) measures a distance of 2.5 meters between asset B and the location at which the gesture sequence (591) was performed.

FIG. 5.3 shows a third diagram of the system. At [1], each asset (asset A, asset B, asset C, and asset D) sends their sensor data (which was previously captured, see e.g., FIG. 5.2) to a gesture mapper (560). The sensor data may specify the gesture sequence, the orientation of the gesture sequence, and the distance between the corresponding asset and the gesture sequence.

At [2], the gesture mapper uses the obtained sensor data to identify the gesture components, the target asset (i.e., asset A in this example), and the workflow associated with each gesture component based on a gesture mapping that maps each gesture component to a workflow. For gesture component A, the identified workflow is to group all workloads executing on the target asset. For gesture component B, the identified workflow is to migrate selected workloads to an available asset based on a policy implemented by the target asset.

At [3], the identified workflows are sent to a client (530) that manages the operation of the assets (asset A, asset B, asset C, and asset D) in the data center. The client (530) executes the identified workflows. Specifically, the client (530) groups the workloads of asset A and initiates a migration of the workloads to an asset based on a policy of asset A. The policy specifies that any workloads that are to be migrated from asset A are to be first migrated to asset B if asset B is available.

At [4], the client (530) initiates the transfer of workloads in asset A to asset B. Specifically, the client (530) sends a command to initiate the transfer of a group of workloads specified in the workflow to asset B.

At [5], asset A initiates the transfer of the workloads to asset B. In this manner, the operation of asset A is prepared for a shut down without interrupting the workloads previously operating on asset A.

End of Example

Figure 6:
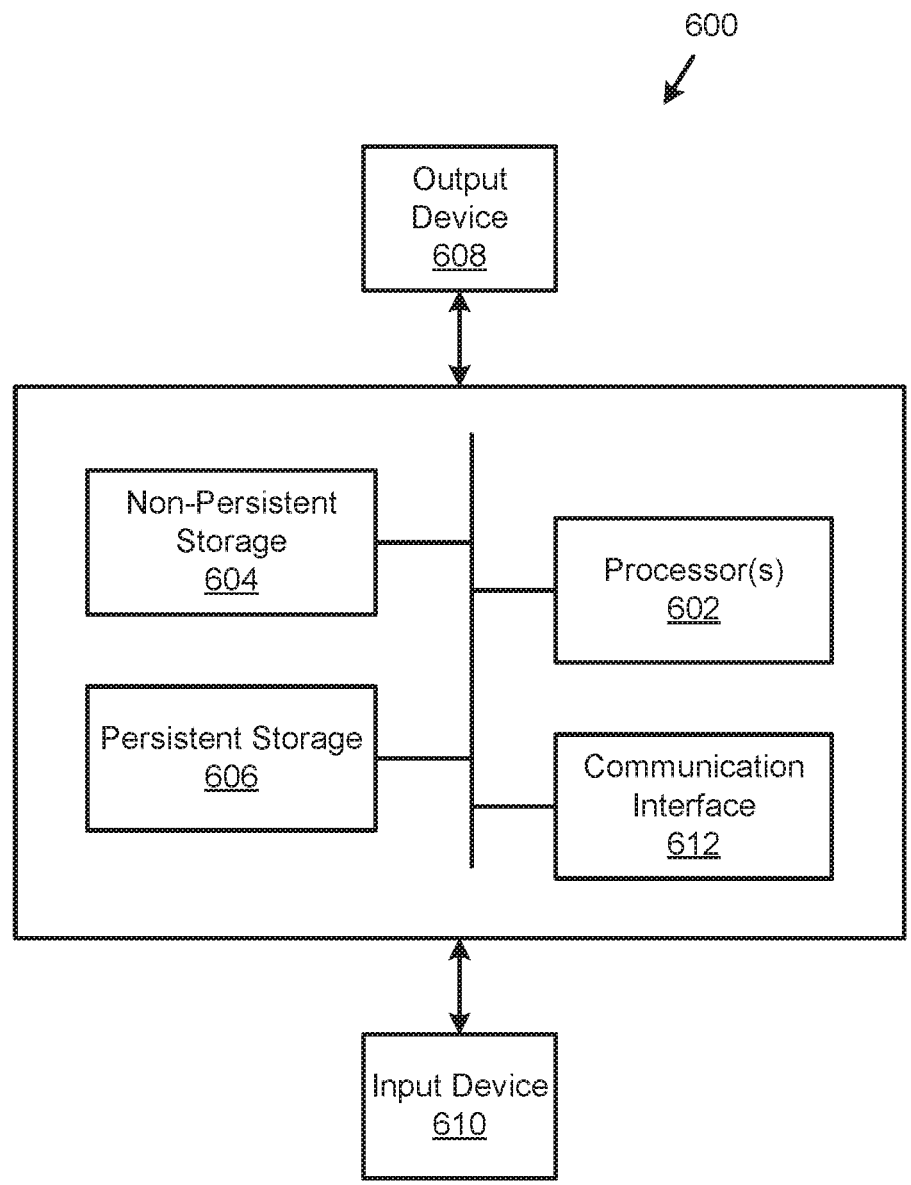
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for performing workload management of assets without the direct physical use of a computing device. Embodiments of the invention enable a user (e.g., a person) to initiate workflows without utilizing devices that may be difficult to interface with directly (e.g., via a push of a button or via a touch screen, etc.). The user may be enabled to initiate tasks such as migration, prioritization, and/or shutdown of workloads executing on the assets by directly communicating with sensors located near the workload and selecting the workloads that are to be affected and communicating the tasks using gestures such as, for example, hand gestures.

Thus, embodiments of the invention may reduce the cognitive burden on a user thereby improving the usability and/or serviceability of a deployment.

Additionally, embodiments of the invention may provide a system that generates map of a deployment without causing interference. For example, by utilizing photonic sensors that operate using electromagnetic radiation outside of the frequency range in which communications are transmitted, location information regarding assets of the deployment may be obtained without radiating electromagnetic radiation near the deployment that may otherwise interfere with communications or other aspects of the operation of the deployment.

Thus, embodiments of the invention may reduce the computing resource cost for performing workload management by enabling the user to more efficiently communicate workload tasks without direct use of a physical device.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing a deployment, comprising:
obtaining, by a location awareness sensor in the deployment, a gesture sequence, wherein the gesture sequence comprises a gesture component,
   wherein at least a portion of the gesture component is performed by a person's hand,
   wherein a target asset comprises the location awareness sensor and a set of computing components,
   wherein the target asset is mounted on a rack of a frame, and
   wherein the location awareness sensor is located on an external surface of the target asset;
identifying a workflow associated with the gesture component using a gesture mapping, wherein the gesture mapping specifies a mapping between the gesture component and the workflow; and
applying the workflow to the target asset.

2. The method of claim 1, wherein applying the workflow to the target asset comprises performing a workload task on a workload executing on the target asset.

3. The method of claim 2, wherein the workload task is one selected from a group consisting of migration, prioritization, grouping, and shutting down.

4. The method of claim 1,
wherein the gesture sequence further comprises a second gesture component,
wherein the method further comprises:
   identifying a second workflow associated with the second gesture component using the gesture mapping;
   applying the second workflow to the target asset.

5. The method of claim 4, wherein the gesture sequence specifies a relative order of the gesture component and the second gesture component.

6. A non-transitory computer readable medium comprising computer readable program code, which when executed by a computer processor enables the computer processor to perform a method for managing a deployment, the method comprising:
obtaining, by a location awareness sensor in the deployment, a gesture sequence, wherein the gesture sequence comprises a gesture component,
   wherein at least a portion of the gesture component is performed by a person's hand,
   wherein a target asset comprises the location awareness sensor and a set of computing components,
   wherein the target asset is mounted on a rack of a frame, and
   wherein the location awareness sensor is located on an external surface of the target asset;
identifying a workflow associated with the gesture component using a gesture mapping, wherein the gesture mapping specifies a mapping between the gesture component and the workflow;
applying the workflow to the target asset.

7. The non-transitory computer readable medium of claim 6, wherein applying the workflow to the target asset comprises performing a workload task on a workload executing on the target asset.

8. The non-transitory computer readable medium of claim 7, wherein the workload task is one selected from a group consisting of migration, prioritization, grouping, and shutting down.

9. The non-transitory computer readable medium of claim 6,
wherein the gesture sequence further comprises a second gesture component,
wherein the method further comprises:
   identifying a second workflow associated with the second gesture component using the gesture mapping;
   applying the second workflow to the target asset.

10. The non-transitory computer readable medium of claim 9, wherein the gesture sequence specifies a relative order of the gesture component and the second gesture component.

11. A system, comprising:
a processor; and
memory comprising instructions, which when executed by the processor, perform a method, the method comprising:
   obtaining, by a location awareness sensor in a deployment, a gesture sequence, wherein the gesture sequence comprises a gesture component,
      wherein at least a portion of the gesture component is performed by a person's hand,
      wherein a target asset comprises the location awareness sensor and a set of computing components,
      wherein the target asset is mounted on a rack of a frame, and
      wherein the location awareness sensor is located on an external surface of the target asset;
   identifying a workflow associated with the gesture component using a gesture mapping, wherein the gesture mapping specifies a mapping between the gesture component and the workflow;
   applying the workflow to the target asset.

12. The system of claim 11, wherein applying the workflow to the target asset comprises performing a workload task on a workload executing on the target asset.

13. The system of claim 12, wherein the workload task is one selected from a group consisting of migration, prioritization, grouping, and shutting down.

14. The system of claim 11,
wherein the gesture sequence further comprises a second gesture component,
wherein the method further comprises:
   identifying a second workflow associated with the second gesture component using the gesture mapping;
   applying the second workflow to the target asset.

15. The system of claim 14, wherein the gesture sequence specifies a relative order of the gesture component and the second gesture component.

* * * * *